United States Patent [19]

Morino et al.

[11] Patent Number: 4,636,970

[45] Date of Patent: Jan. 13, 1987

[54] PERSONAL TYPE COMPUTER WITH EXECUTION OF PROGRAMS IN ROM AND RAM

[75] Inventors: Masuaki Morino, Kyoto; Yoshiyuki Fujikawa; Isamu Haneda, both of Nara; Tetsuo Myoi, Kyoto, all of Japan

[73] Assignee: Sharp Kabushiki Kaisha, Osaka, Japan

[21] Appl. No.: 783,819

[22] Filed: Oct. 7, 1985

Related U.S. Application Data

[63] Continuation of Ser. No. 442,373, Nov. 17, 1982, abandoned.

[30] Foreign Application Priority Data

Nov. 24, 1981 [JP] Japan .................................. 56-189002

[51] Int. Cl.[4] .............................................. G06F 9/00
[52] U.S. Cl. .................................................. 364/706
[58] Field of Search ... 364/200 MS File, 900 MS File, 364/706

[56] References Cited

U.S. PATENT DOCUMENTS 4,377,852 3/1983 Thompson .......................... 364/900

OTHER PUBLICATIONS

MC68120/MC68121, Intelligent Peripheral Controller Users Manual, pp. 2–8 Motorola 1981.

Primary Examiner—Gareth D. Shaw
Assistant Examiner—John G. Mills
Attorney, Agent, or Firm—Birch, Stewart, Kolasch & Birch

[57] ABSTRACT

An electronic-type computer in which programs may be entered from a key entry device into a Random Access Memory in which they are stored, and those programs may be read out from the contents of that Random Access Memory and executed, while, in addition, programs may be written and stored ahead of time in a Read Only Memory, and those programs may be read out from the contents of that Read Only Memory and directly executed. The previously written and stored programs in the expandable ROM do not utilize the RAM user program area, and the large volume of programs contained within the expandable ROM can be directly executed. In addition, the user programs and the programs in the expandable ROM may be linked together and executed. Furthermore, it is unnecessary to give instructions for the programs in the expandable ROM to be transferred to the RAM.

1 Claim, 10 Drawing Figures

| | |
|---|---|
| P1 | ROM61, First Address |
| P2 | ROM61, First Program Address |
| P3 | RAM12, First Address |
| P4 | RAM12, Last Address |
| P5 | RAM12, First Program Address |
| P6 | RAM12, Last Program Address |
| P7 | RAM12, Last date Address |
| P8 | Number of Line Being Executed |

PERSONAL TYPE COMPUTER WITH EXECUTION OF PROGRAMS IN ROM AND RAM

This application is a continuation, of application Ser. No. 442,373 filed on Nov. 17, 1982, now abandoned.

BACKGROUND OF THE INVENTION

The present invention relates to an electronic-type computer, such as a programmable desk top calculator or personal computer, into which a program is entered and then is executed.

In a conventional electronic-type computer, a program is written and entered into a Random Access Memory (RAM), then executed. Or else, a program is not written, but an all-purpose, expandable, multiple program Read Only Memory (ROM) is supplied in modular form, and those programs are selectively transferred to the RAM, and then executed.

In this conventional electronic-type computer, when using a high-level program language of the conversational form, such as Basic, the RAM which stores the programs, and the ROM, which provides control, must be of fairly large capacity memory, and such a large capacity RAM, and large capacity controlling ROM must be incorporated into the computer. The memory capacity of a RAM of large scale integrated (LSI) construction, is from one part in several tenths to one part in several hundredths of that of a packaged ROM of identical shape. Therefore, in a conventional small, portable electronic-type computer conforming to the limitations of the memory capacity of the RAM, the capacity of the program which can be run is of necessity limited, and therefore an expandable ROM program could not be effectively utilized.

OBJECTS AND SUMMARY OF THE INVENTION

One object of the present invention is to solve the abovementioned technical problems, and to provide an electronic-type computer which can execute many problems within the restricted memory capacity of a RAM. Another object of the present invention is to provide an electronic-type computer in which data may be entered by means of keys into the RAM and executed, while at the same time a program previously written and stored in the ROM module may be directly executed. Yet another object of the present invention is to provide an electronic-type computer in which it is possible to link and execute the ROM programs and the RAM programs.

In order to achieve the objects outlined above, the present invention provides an electronic-type computer in which programs may be entered from a key entry device into a Random Access Memory, in which they are stored, and from the contents of that Random Access Memory the said programs may be read out and executed, while, in addition, programs may be previously written and stored in a Read Only Memory, and from the contents of that Read Only Memory the said programs may be read out and directly executed.

In the present invention, because it is unnecessary for a ROM program to be first transferred into RAM before being executed, the contents of the memory can be effectively utilized. That is to say, the previously written and stored programs in the expandable ROM do not utilize the RAM user program area, and the large volume of programs contained within the expandable ROM can be directly executed. In addition, the user programs and the programs in the expandable ROM may be linked together and executed. Furthermore, it is unnecessary to give instructions for the programs in the expandable ROM to be transferred to the RAM.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
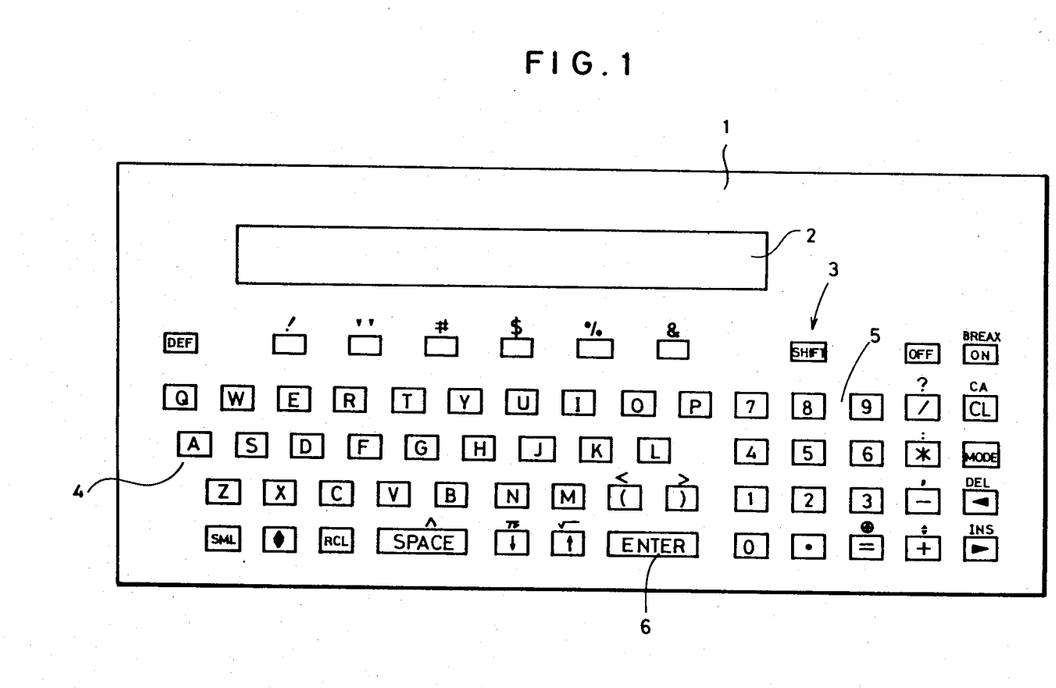
FIG. 1 is a plan drawing of one embodiment of an electronic-type computer 1 according to the present invention.

Following is a detailed description of the invention given with reference to the drawings. FIG. 1 is a plan drawing of one embodiment of an electronic-type computer 1 according to the present invention. This electronic-type computer 1 contains a liquid crystal display apparatus 2 and a key input device 3. The key input device 3 contains some keys 4 for entry of letters, and some keys 5 for entry of numbers, as well as a key 6 to control the input operation. The display apparatus 2 is constructed as a dot matrix, 7 dots high by 156 dots in width, and in the lateral direction displays what is referred to as one line of characters and figures.

Figure 2:
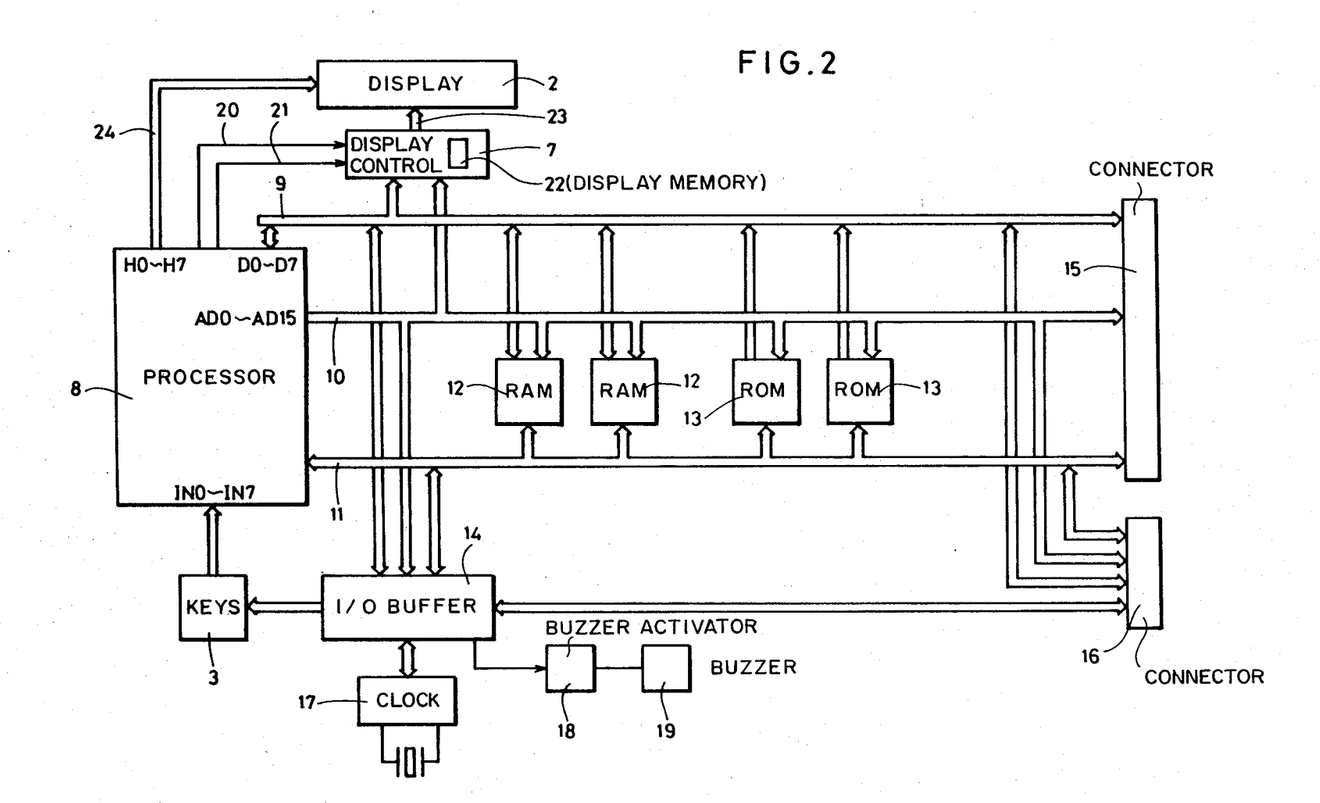
FIG. 2 is a block diagram of the circuitry of the embodiment of the present invention illustrated in FIG. 1.

FIG. 2 is a block diagram of the circuitry of the electronic-type computer 1 illustrated in FIG. 1. The display apparatus 2 controls the activation of each dot through a display activation control circuit 7. From the processing apparatus 8, a data bus 9, an address bus 10, and a control bus 11 are arranged in parallel, and to these buses 9, 10, 11, RAMs 12, ROMs 13, an input/output buffer 14, and connectors 15 and 16 are connected. The buses 9 and 10 are connected to the display activation control circuit 7. A key-stroke signal from the input/output buffer 14 is entered into the key input/output device 3, and through the operation of the keys 4, 5, and 6, with which the key input/output device is provided, a key return signal is entered into the processing apparatus 8. A system area SY (see FIG. 4), which is utilized for flags and registers, is included in the RAM 12, and stores programs, etc. Previously written programs, such as an interpreter which executes instructions, and miscellaneous control programs, are stored in the ROM 13. The connector 15 is used for connecting a modularized, external RAM, and the expandable ROM 61. The connector 16 is used to connect such external input/output devices such as a data recorder and a printer, and is also used to connect a memory device to expand the storage capacity. Input/output (I/O) ports 1 to 4 are connected to a clock circuit 17, and, in addition, to an activating circuit 18 which puts out a signal to sound a buzzer or other such sound-producing device 19. The processing apparatus 8 emits a display ON/-OFF signal through a line 20 to the display activation circuit 7, and, in addition, emits a synchronous signal through line 21. The display activation circuit 7 is furnished with a display memory 22, and this display memory 22 contains the storage area corresponding to each point of the display apparatus 2, and sends out a segment signal to the display apparatus 2 through a line 23. The processing apparatus 8 emits a backplate signal through line 24.

Figure 3:
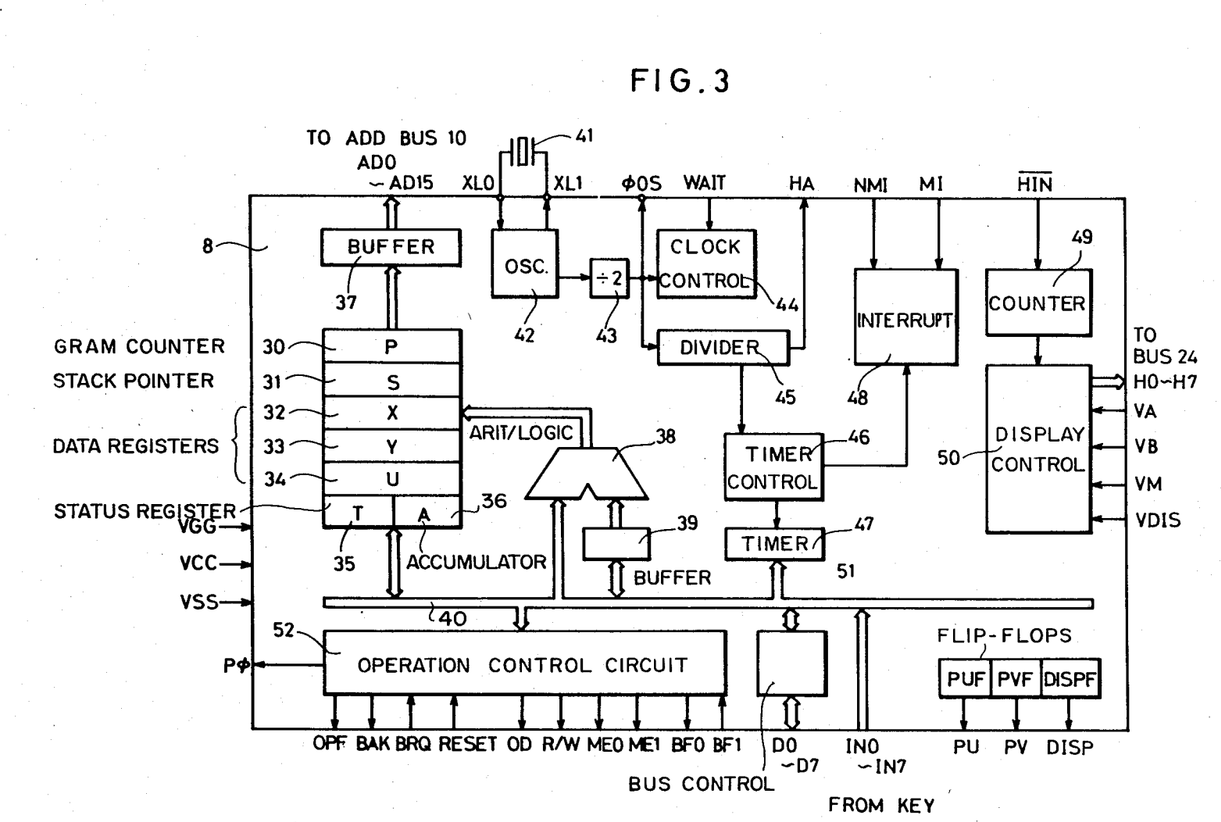
FIG. 3 is a block diagram of the circuitry of a processing apparatus 8, which is part of the circuitry shown in FIG. 2.

FIG. 3 is a block diagram showing the configuration of the circuitry of the processing apparatus 8. Its contents include a program counter 30, which is a 16 bit register indicating the address following that of the current instruction under execution, and, on execution of the displayed instruction, the contents of the program counter 30 are automatically incremented by 1, to again indicate the next address. A stack pointer 31, which is a 16 bit register, indicates the address of the next stack which can be used in the push-down or pop-up stacks of the RAM 12. Each of three data registers 32, 33, and 34, which are 16 bit registers, can also be used as data pointers. A status register 35 is a 5 bit register which stores the status of each type of calculation, i.e. borrow, zero, or overflow, from the results of the calculation. An accumulator 36 has an 8-bit configuration and is used to retain the results of a calculation and to transfer data to an exterior memory. An address buffer 37 is connected to the address bus 10. Each line connected to address bus 10 is indicated be reference codes AD0 to AD15.

An arithmetic and logic operation circuit 38 is connected to a bus 40, both directly, and through an operation buffer 19. An externally attached oscillating element 41 is attached to an oscillation circuit 42. The oscillation output from this oscillation circuit 42 is halved in a divider circuit 43, and half is transmitted to as a clock signal 0OS, and at the same time is provided to a clock control circuit 44, and to a divider circuit 45. The clock control circuit 44 controls the starting and stopping of an internal clock in response to a WAIT signal. The divider circuit 45 emits a synchronous signal HA, and receives a signal from a timer control circuit 46. The timer control circuit 46 exercises the count control of a 9-bit timer 47 and also the timer interrupt control. The timer 47 is constructed as a polynomial counter and counts time for the timer interrupt. An interrupt control circuit 48 exercises control of NMI and MI signals requesting interrupts and in response to signals from the timer control circuit 46. A counter 49 is used to generate the backplate signal for the display apparatus 2. The signal HIN received from this counter 49 is usually the previously mentioned synchronous signal HA. A display control circuit 50 emits backplate signals H0 to H7. This display control circuit 50 receives voltages VDIS, VA, VB, and VM from an electrical supply circuit which is not shown on the drawing. Codes PUF and PVF refer to general purpose flip-flops, and a flip-flop DISPF exercises control over the display ON/OFF. On input of signals IN0 to IN7 from the key input device 3, 8 bits of data are introduced into an internal accumulator. A data bus control circuit 51 receives an 8-bit signal D0 to D7, and sends out a control signal through the bus 40. In addition, an instruction decoder and an operation control circuit 52 are provided. Code R/W represents read signals to and write signals from memory. MEO and MEI represent memory enable signals.

Figure 4:
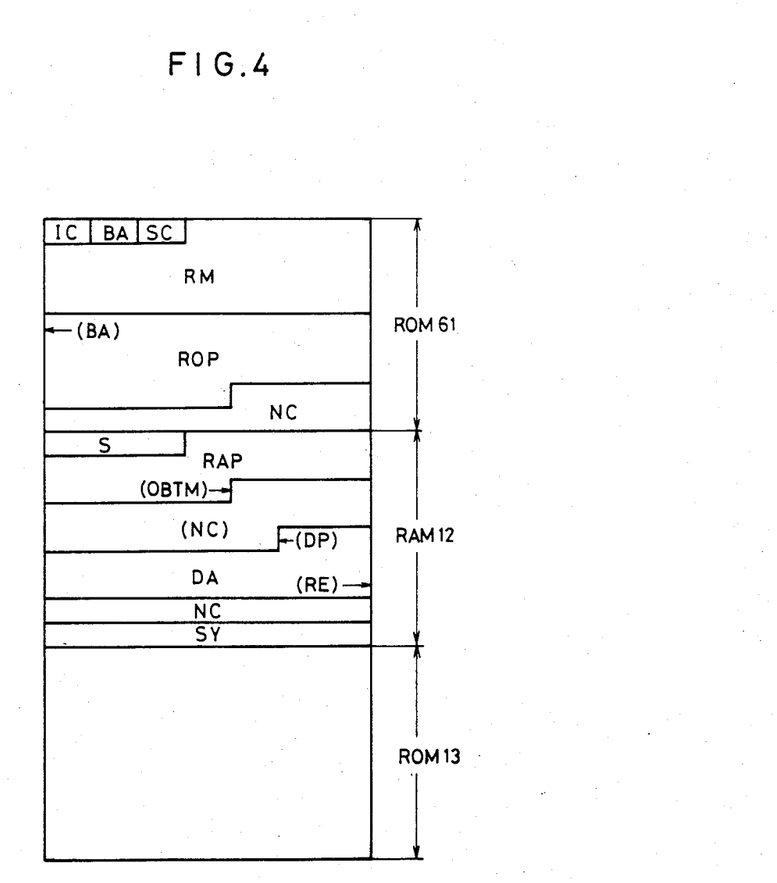
FIG. 4 is a layout drawing illustrating the address areas of a RAM 12, a ROM 13 and a ROM 61.

FIG. 4 shows the arrangement of the RAMs 12 and the ROMs 13 of the electronic-type computer 1, and the address area of the expandable ROM 61 in parallel with the electronic-type computer 1. The control program is built into the ROMs 13. Contained in the ROM 61 are areas for receiving programs, including the area IC in which is recorded the identification code which indicates that it is an expandable read only memory, the area BA in which is recorded the beginning address information for program storage, the area SC in which is recorded the distinguishing code signifying whether or not the contents of a programs is secret, and the area RM for machine language programs for using subroutines, etc. These programs have an area RAP in the random access memory 12, which will be explained later, and an area ROP in ROM 61 in which are contained the programs written in the same language, as well as an area NC for future use.

The RAM 12 is provided with an area S in which is recorded an identification code indicating that it is a random access memory, along with definitions, etc.; an area RAP in which programs are recorded; an unused area (NC), a data area DA, an unused area NC, and a system area SY.

Programs entered by means of keys 4, 5, 6, etc., are stored from the first address of area RAP, and the last address is OBTM. Data such as numeric and alphabetic variables, and variables in arrays, etc., are stored in area DA at addresses beginning with the high order address RE, down to the lowest address, with the last starting address being DP. Therefore area (NC) is used as an additional program area and data area. System area SY is used for each type of flag and register.

Figure 5:
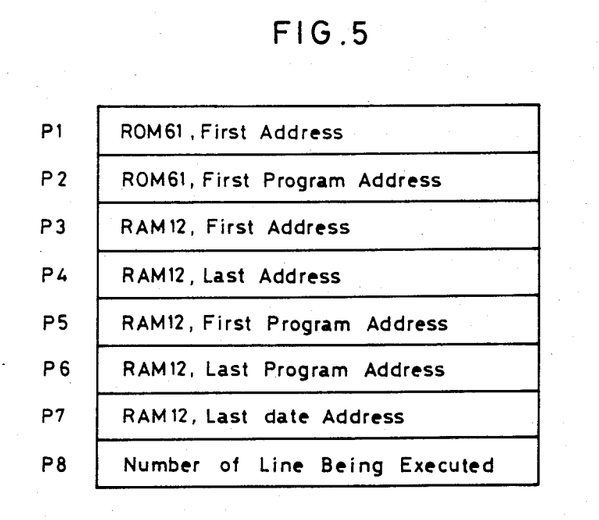
FIG. 5 illustrates each point, P1 to P8, of the stored address tables of the ROM 61 and the RAM 12.

FIG. 5 illustrates each point, P1 to P8, of the stored address tables of the ROM 61 and the RAM 12. These points P1 to P8 form a part of system area SY shown in FIG. 4 for the RAM 12. The point P1 contains the higher order address of the expandable ROM 61; the point P2 contains the higher order address of the programs in the expandable ROM 61; the point P3 contains the higher order address of the RAM 12; the point P4 contains the last address of the RAM 12; the point P5 contains the higher order address of the programs in the RAM 12; the point P6 contains the last address of the programs in the RAM 12; the point P7 contains the last address of the data area; and the point P8 contains the execute line number.

On powering up the electronic-type computer 1, it is first ascertained whether or not the ROM 61 is expanded. Prior to powering down if this condition has changed, the contents of the points P1, P2, P3, and P4 are read from the ROM 61 and the RAM 12, and set up in the system area SY. The starting address of the ROM 61 is obtained by inferring the existence of the identification code for the area IC. The starting address of the programs in the ROM 61 is obtained from the address information in the area BA, and is indicated in FIG. 4 as (BA). The first and last address of the RAM 12 is obtained by judging to what extent the RAM is expanded. That is to say, the prescribed code is recorded in the area S, and depending on whether or not that code is recorded, the existence of the RAM area is determined. Furthermore, the last address of the RAM 12 can be expanded as far as the beginning of the system area SY, that is to say, as far as the last address in the area NC of the RAM 12 shown in FIG. 4, but, in that case, the top of the system area SY is also the last address in RAM 12. The starting address and the last address of the programs in the RAM 12 change according to the program initialization and the program input, and are renewed in conformance with the contents of the points P5 and P6. The last address of the data in the RAM 12 is DP of the area DA shown in FIG. 4, and the data area is ensured according to the execution of the program, and the contents of the point P7 are renewed. During the execution of the program, the line number LP is renewed every time a program line is executed, and the contents of the point P8 are also renewed, so that the point P8 corresponds to a register LINE", which will be described later.

Figure 6:
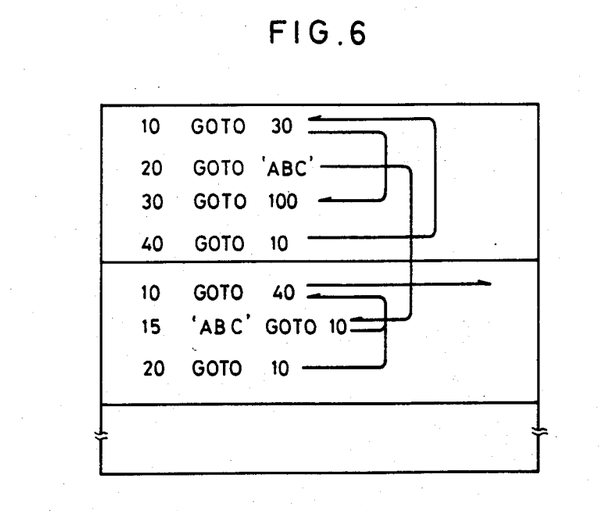
FIG. 6 illustrates one example of a program for the jump instruction GOTO.
Figure 7:
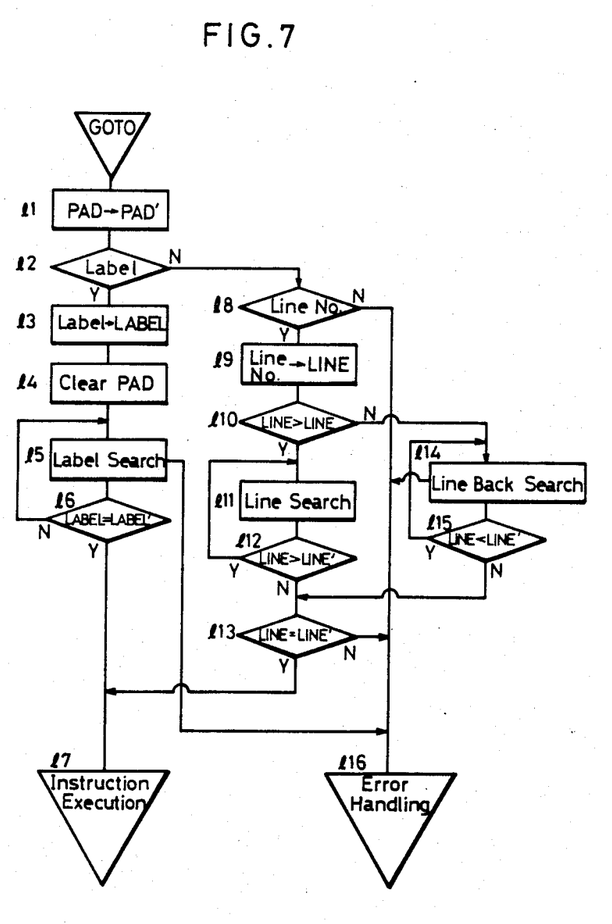
FIG. 7 is a flowchart of the GOTO instruction of FIG. 6.

FIG. 6 illustrates one example of a program for the jump instruction GOTO. The program containing the lines numbered 10, 20, 30 and 40 is contained in the expandable ROM 61, and the program with the lines numbered 10, 15, and 20 is a program in the RAM 12. FIG. 7 is a flowchart of the GOTO instruction of FIG. 6.

A register PAD' is an auxiliary register for PAD. A register LINE' is a register in which the line number of the program under execution is stored while that program is in the process of being executed. A register LABEL is a register in which the designated label of the GOTO program is stored. A register LABEL' is a register in which the label of the program line is stored.

In 11, when there is no jump destination and because there is an error, in order to indicate where the error occurred the program number PAD during execution is transferred into PAD', and at the time of the error the position indicated by PAD' is the position of the error.

In 12, the decision is made whether the jump designation of the GOTO instruction is labelled or not. For a designated label, single quotation marks are used as in the line <20 GOTO 'ABC"> in FIG. 6.

In 13, the label of the jump destination is transferred to the register LABEL, and In 14, the register PAD is cleared in order to search for this label and the program line which has the same label, from the top of the program memory.

In 15, the program line lable, as in <15 'ABC' GOTO 10> of FIG. 6, has a ' inserted after the line number. A search is conducted for the label from the indicated position of PAD in the direction of OBTOM. If the label is not found, because there is no jump destination the program proceeds to 116. If the label is found, that label is transferred to LABEL', and that position moves to PAD.

In 16, it is then ascertained whether or not that label is the designated label, and if it is, then in order to execute the instruction in the program line having that lable, the program proceeds to 17. If it is not the designated label, then the program returns to 15 in order to find the label.

In 18, if the jump designated in 12 is not labelled, the decision is made whether or not there is a line number. If the decision is negative the program proceeds to 116.

In 19, the line number of the jump destination is transferred to LINE, and

In 110, a decision is made whether or not the jump destination is before or after the line presently being executed, and In 111, if the jump destination is after the line presently being executed, then from PAD in the direction of OBTM, the line number of the of the closest program line is transferred to LINE', and PAD is moved to that location. If there is no program at or after PAD, the program proceeds to 116.

In 112, LINE', the program line number obtained, is compared with LINE, and if LINE is larger than LINE', because the jump destination is further back, the program returns to 111. If LINE is not larger than LINE', the program proceeds to 113.

In 113, the decision is made whether or not LINE and LINE' are equal, and if they are found to be equal, then this program line is the jump destination, and in order that execution may be carried out, the program proceeds to 17. But if they are not equal, then because there is no jump destination, the program proceeds to 116.

In 114, when LINE is found not to be greater than LINE" in 110, because the jump destination is before the line being executed, including the line presently under execution, the start of the program is in the opposite direction from the indicated position of PAD. A search is made for the line number of the nearest program line, and when it is moved to the position of LINE, at the same time that position becomes PAD. If the program line is not in the starting direction from PAD, then the program proceeds to 116.

In 115, LINE and LINE' are compared, and if LINE is smaller than LINE', then because the jump destination is further ahead, the program returns to 114. If LINE is not smaller than LINE', then the program proceeds to 113.

Figure 8:
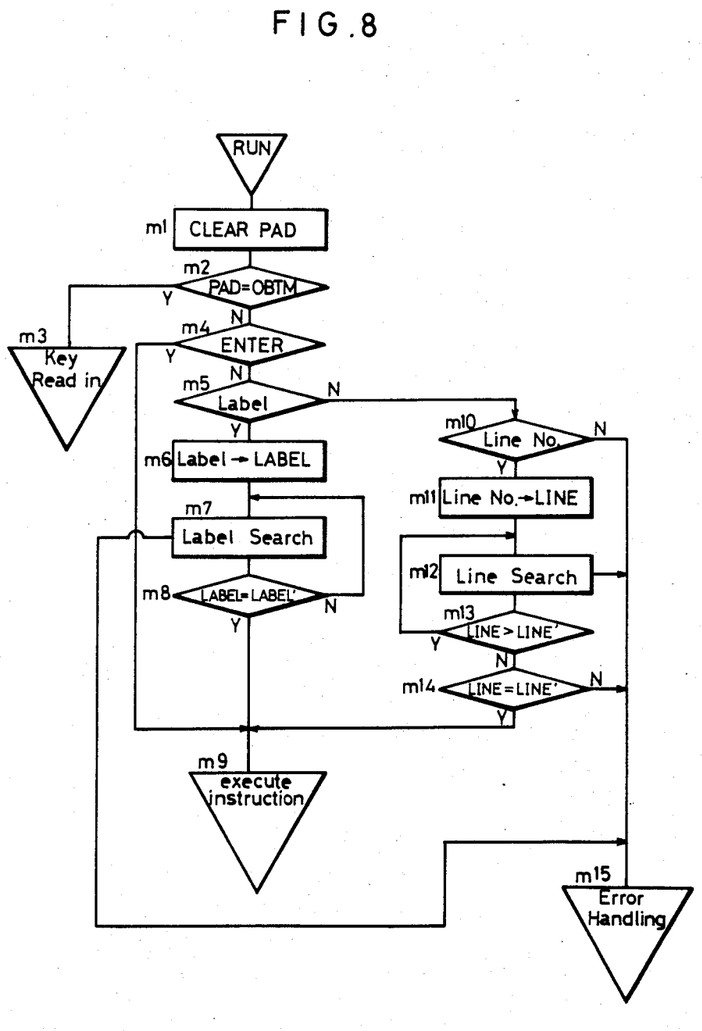
FIG. 8 is a flowchart of a RUN instruction to execute a program.

Next, the method of executing a program will be outlined. FIG. 8 is a flowchart of a RUN instruction to execute a program.

In m1, PAD is cleared, and

In m2, in order to make a decision as to whether or not the program is stored in the computer, PAD and OBTM are compared. When PAD and OBTM are equal, this means the program is not in storage, so the program proceeds directly to m3 to await the next instruction.

In m4, after the RUN instruction, if there is no designated start line, execution commences from the start of the program on an ENTER instruction, and because of this, after RUN, the decision is made as to whether or not an ENTER instruction is present. When ENTER is present, the program proceeds to m9.

In m5, when ENTER is not present, a decision is made as to whether or not there is a designated start label.

In m6, when a label is present, it is moved to LABEL, and

In m7, a search is made from the indicated PAD position in the direction of OBTM for a program line having that label, and if it is found, that label is moved to the LABEL' register, and that position is moved to PAD. If it is not found, because there is no jump destination the program proceeds to m15.

In m8, the obtained LABEL' is compared with LABEL, and, if they are equivalent, the program proceeds to m9 so that the execution of the program can be carried out from the labelled line. If LABEL' and LABEL are not equivalent, the program returns to m7 to find the next label.

In m10, when in m5 it has been ascertained that there is no designated start label, the decision is then made as to whether or not there is a designated starting line number. When there is no line number, the program proceeds to m15.

In m11, the designated line number is moved to LINE, and,

In m12, a search is made from the indicated PAD position in the direction of OBTM, and the line number of the closest program line found is moved to the LABEL' register, and that position is moved to PAD. If the program line number is not found at or after PAD, because there is no jump destination the program proceeds to m15.

In m13, LINE is compared with LINE', and if LINE is larger than LINE', because the program execution commencement line is further back, the program returns to m12.

In m14, the decision is made whether or not LINE and LINE' are equal, and if they are found to be equal, then in order that execution may be started from the designated line the program proceeds to m9, but if they are not equal, then because there is no designated line, the program proceeds to m15.

In this manner, when there are multiple programs in the computer, by labeling the program lines it is possible to commence execution of a program from a desired line, and on designating a line number, the execution of the program is commenced from a line within the very first program with the same line number.

Figure 9:
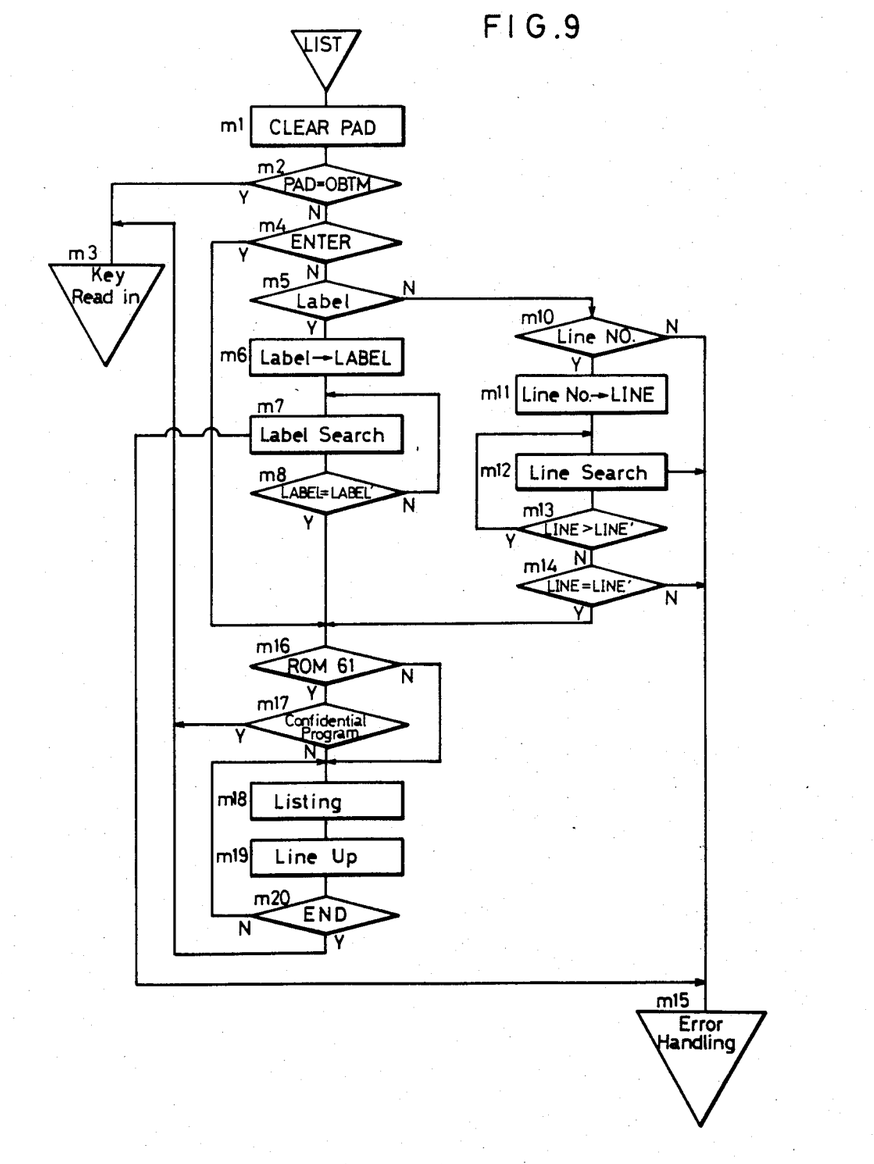
FIG. 9 is a flowchart showing the execution of an instruction to list the contents of a program.

FIG. 9 is a flowchart showing the execution of an instruction to list the contents of a program. The listing output is designated in such terms as <LIST>, <LIST line number>, and <LIST label>. These designations are the same as the program execution designations, and the search procedure for the start location is the same as shown in the flowsheet of FIG. 8, so the reference codes for the corresponding parts are the same.

In m16, on finding the starting line, a decision is made as to whether this program area is in the RAM 12 program area, or in the ROM 61 program area. This decision is made according to the relative relationship to the RAM program starting address within the address table of FIG. 5. If the program area is within the RAM 12 program area, the program proceeds to m18.

In m17, a decision is made according to the code SC as to whether or not there are confidential programs in the ROM 61 program area. If there are confidential programs present, the program proceeds to m3. In other words, a listing will not be made. If there are no confidential programs, the program proceeds to m18.

In m18, the contents of one line is translated and listed.

In m19, when the listing of one line is completed, the program moves to the next line.

In m20, when the listing of all lines is completed, the program returns to m18, and when all listing is completed, the program moves to m3.

Figure 10:
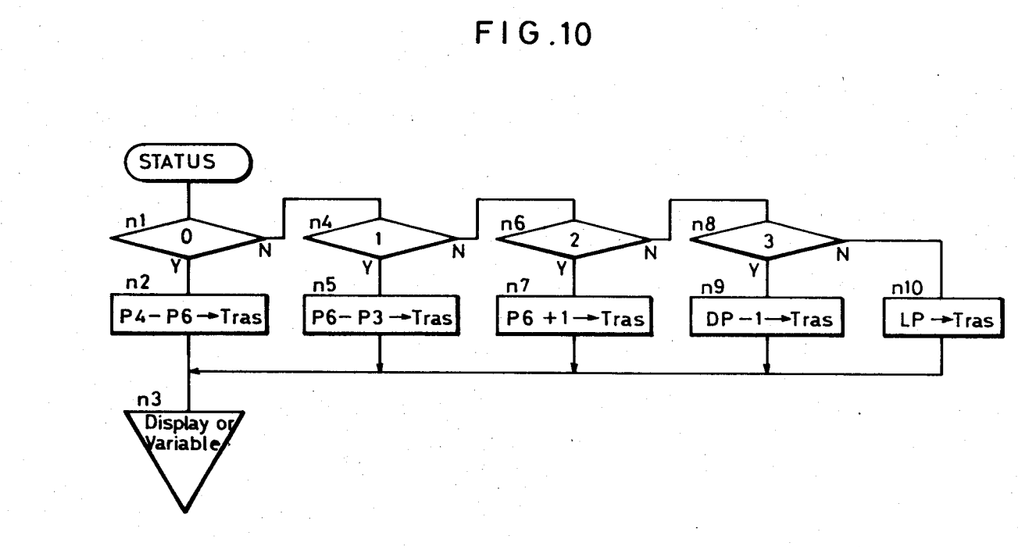
FIG. 10 is a flowchart of an instruction to show the status of each program entered.

FIG. 10 is a flowchart of an instruction to show the status of each program entered. It is carried out on entering <STATUS VALUE ENTER>by key, or by inserting the line <VARIABLE=STATUS VALUE> into the program.

In n1, a decision is made as to whether or not the value is 0. If 0, the program proceeds to n2.

In n2, the value of P4−P6, i.e. the number of bytes remaining in the RAM 12 programs is transferred and the program moves to n3.

In n4, if the value is not 0, a decision is made as to whether or not it is 1. If 1, the program moves to n5.

In n5, the value of P6−P3, i.e. the number of bytes in the RAM 12 programs is transferred and the program moves to n3.

In n6, if the value is not 1, a decision is made as to whether or not it is 2. If 2, the program moves to n7.

In n7, the value of P6+1, i.e. the address of the value of the last address of the program PAM 12 is transferred and the program moves to n3.

In n8, if the value is not 2, a decision is made as to whether or not it is 3. If 3, the program moves to n9.

In n9, the value of Dp−1, i.e. the address immediately before the last address in the data area is transferred, and the program moves to n3.

In n10, if the value is not 3, i.e. greater than 4, LP, i.e. the line number of the line being executed, is transferred, and the program moves to n3.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A programmable desk top calculator or personal computer comprising:
   a key input device;
   internal Random Access Memory means for reading and writing information input by said key input device;
   internal Read Only Memory means for storing information;
   external Read Only Memory means for storing program information, including,
     an area for storing machine language program information, and
     an area for storing high level language program information;
   said internal Random Access Memory means including,
     an area for storing written program information,
     an area for storing written data information, and
     an area for storing address information including,
       pointer means for storing address information containing,
       an address of said external Read Only Memory means,
       an address of said area for storing said high level language information in said external Read Only Memory means,
       an address of said area for storing written program information,
       an address of said area for storing written data information, and
       an address of a line of program information to be executed, and
   means for directly executing programs stored in said external Read Only Memory means without being loaded into said internal Random Access Memory means, by reading the respective addresses of said external Read Only Memory means and said area for storing high level language program information from said internal Random Access Memory means.

* * * * *